UNITED STATES PATENT OFFICE.

THOMAS CARNEY, OF ST. LOUIS, MISSOURI.

IMPROVEMENT IN METHODS OF SILVERING GLASS MIRRORS.

Specification forming part of Letters Patent No. 201,497, dated March 19, 1878; application filed February 18, 1878.

*To all whom it may concern:*

Be it known that I, THOMAS CARNEY, of St. Louis, in the county of St. Louis and State of Missouri, have invented certain new and useful Improvements in Processes of Depositing Alloys as a Backing for Mirrors, of which the following is a specification:

This invention relates to an improved method of silvering glass, and is especially designed for the manufacture of mirrors.

It is well known that an addition of copper to silver forms an alloy far exceeding pure silver in tenacity, and when silver is used for the manufacture of articles subject to wear it is usually so alloyed. By taking advantage of this property of silver and copper alloy, I secure the requisite hardness of the coating, which I deposit upon mirrors and other articles, to withstand all ordinary usage to which they are likely to be subjected, and by the improved solutions which I employ and my process of preparing the same and effecting the necessary deposit, I secure a greater compactness, adherence, and durability of the said deposit than has heretofore been known in the art.

In carrying out my invention, I prepare the ingredients as follows, in about the proportions named. I first prepare a compound, which I designate as "solution No. 1," as follows: I take fifty grams of soda-potassa tartrate, or Rochelle salts, and dissolve the same in sixteen ounces of distilled or rain water. I then dissolve thirty-two grains of nitrate of silver in eight ounces of distilled or rain water, and add this, drop by drop, to the alkaline solution just mentioned, stirring all the time, until the appearance of a white precipitate, flecked with dark spots, when the mixture should be poured into an evaporating-dish and placed over a hot fire. I then dissolve two (2) grains of $CuSO_4$ (blue vitriol, or sulphate of copper) in two (2) drams of pure water, which gives the water a pale-bluish tint. Now, when dark spots appear on the surface of the liquid in the evaporating-dish, I add to it four or five drops of the cupric-sulphate solution previously made. The contents of the evaporating-pan are then brought to a boiling temperature, and so continued until a fine black precipitate is deposited on the sides, which is then set aside to allow the contents to cool and settle, said contents being afterward filtered. I also prepare a solution, No. 2, as follows: I first take eighty (80) grams of nitrate of silver and dissolve it in twenty (20) ounces of distilled or rain water, and to this I add from one and one-half ($1\frac{1}{2}$) to two (2) ounces of aqua-ammonia, drop by drop, shake well, and allow the solution to settle by standing from, say, six to twelve hours, after which it is filtered.

When, now, I desire to use the solutions for their intended purpose, I take eight (8) ounces of distilled or rain water and add thereto two (2) drams of solution No. 1, stirring well together. I then add to this mixture two (2) drams of the solution No. 2, agitating as before. This quantity is sufficient for properly coating one square foot of glass intended for a mirror. The mixture is to be poured cold upon the glass in a room in which the air has a temperature of from 60° to 90° Fahrenheit, and is allowed to remain from fifteen to twenty minutes, the shorter period when the temperature is at the highest degree named, and the longer period when the air has the lowest temperature. After remaining upon the glass for the time mentioned, there is deposited thereon a coating of the alloy having a brilliant reflecting-surface next to said glass. I then pour off the liquid and rinse the glass with clear water. In order to increase the thickness and durability of the coating, I superimpose a second coating upon the first, which is done by repeating the operation before the first coating is dry, afterward allowing this second coating to dry thoroughly.

After the final coating has become thoroughly dry, I cover the same with a compound composed of alcohol, drop-black, and shellac, upon which, when dry, I place a coat of pure asphaltum varnish or other varnish or paint, which should be devoid of oil, so that it will not combine with the compound with which the metallic alloy has been previously backed.

The proportions of ingredients hereinbefore named I have found to answer quite satisfactorily in temperate climates at about the latitude of Washington; but I wish it to be understood that I do not limit myself to these proportions, as they may be varied when found necessary—as, for instance, the quantity of ammonia should be decreased as the temperature is increased, and the other elements may be used in quantity consistent with their commercial purity.

By the hereinbefore-described process, an alloy having all the qualities of hardness and durability of the ordinary alloys of copper and silver is deposited upon the glass, and the degree of hardness may be varied or modified by varying the proportions of the ingredients employed, as before stated.

It is evident that my invention can be applied to the ornamentation of various articles of glassware, and I do not limit myself, therefore, to its application to the construction of mirrors.

I am aware that tartrates of silver and copper, ammonia, Rochelle salts, and nitrate of silver have been used in various combinations and proportions, and employed in processes for silvering glass; and I do not, broadly, claim either, or a compound of any or all, of these substances in my process.

I am also aware that a patent was granted to Constant A. Laval, November 21, 1876, for a method of manufacturing mirrors by depositing silver upon glass by the mutual reactions of solutions of silver and copper in conjunction with ammonia, nitrate of silver, alcohol, and potassa; and I do not claim his method of preparing his solutions, my invention being an improvement thereon.

What I claim is—

1. The process of preparing a compound suitable for use in silvering glass, by heating an aqueous solution of soda, potassa tartrate, or Rochelle salts, and nitrate of silver, until dark spots appear on its surface, adding thereto a solution of sulphate of copper, then boiling the mixture until precipitation begins, when it is allowed to cool, and then adding thereto a solution of nitrate of silver, distilled or rain water, and aqua-ammonia, substantially as set forth.

2. In the process herein described of preparing a compound for use in silvering glass, the same consisting in heating an aqueous solution of soda, potassa tartrate, or Rochelle salts, and nitrate of silver, until dark spots appear on its surface, the addition of a solution of sulphate of copper, after which the mixture is boiled until precipitation begins, when it is allowed to cool, and is then ready for use, substantially as hereinbefore explained.

In testimony that I claim the foregoing I have hereunto set my hand in the presence of the subscribing witnesses.

THOMAS CARNEY.

Witnesses:
JAMES L. NORRIS,
JAMES A. RUTHERFORD.